ёunited States Patent Office 3,041,578
Patented June 26, 1962

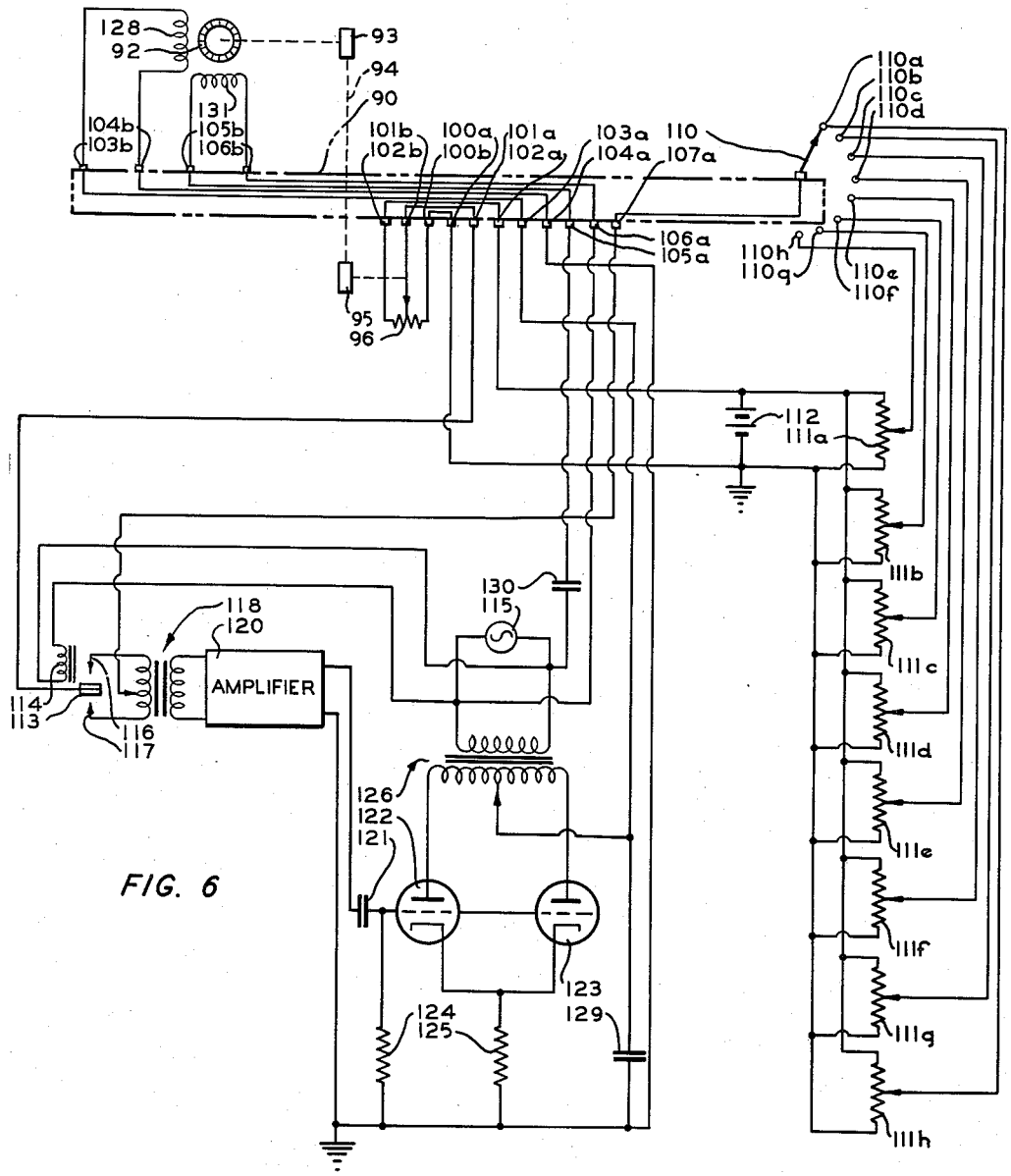

3,041,578
SEISMIC EXPLORATION
Sam D. Elliott, Bartlesville, Okla., assignor to Phillips Petroleum Company, a corporation of Delaware
Filed Feb. 11, 1957, Ser. No. 639,253
10 Claims. (Cl. 340—15.5)

This invention relates to a method of seismic exploration wherein a plurality of separate vibration records obtained from a common subterranean reflection point or area are added in a manner so as to amplify the desired reflections and minimize the extraneous noise vibrations.

Seismic exploration relates to a method of obtaining information regarding subterranean earth formations by transmitting vibrations from a first point at or near the surface of the earth downwardly into the formations and measuring the reflected or refracted vibrations at one or more second points spaced from the first point. It is common practice to detonate an explosive charge to produce the vibrations. A plurality of seismometers are disposed in a predetermined geometric array in spaced relationship from the shot hole. The vibrations incident upon the seismometers are converted into counterpart electrical signals which are amplified and recorded. By timing the arrivals of selected reflections, valuable information can often be obtained regarding the depth and slope of subterranean earth formations. Unfortunately, however, extraneous vibrations normally are present which tend to obscure the recognition of the desired reflected signals. In order to minimize these extraneous vibrations, a number of systems have been proposed which include electrical tuning networks and selected spacings of the vibration pickups. However, there are still large sections of the country wherein it is impossible to obtain accurate information of subterranean formations because of the random noise vibrations.

The present invention relates to an improved method of seismic exploration which involves reflecting a plurality of vibration signals from a common point or a common area in a subterranean formation. The individual reflected signals are recorded separately at the surface of the earth. These signals are then superimposed upon one another in such a fashion that the desired reflections are added, whereas the random noise vibrations tend to cancel one another so that the composite signal contains a maximum peak representative of the reflections. In making the composite record, the individual signals are adjusted in time relationship with one another to compensate for differences in travel paths of the reflected vibrations. This adjustment is performed automatically in accordance with this invention. The several signals preferably are obtained by detonating a plurality of explosive charges in sequence in spaced shot holes along a common line. A plurality of seismometers are disposed along this common line on both sides of each shot hole. In this manner, it is possible to obtain a maximum number of recordings from each shot point.

Accordingly, it is an object of this invention to provide apparatus for recording and reproducing seismic signals in such a manner as to amplify the desired reflections and minimize random vibrations.

Another object is to provide apparatus for combining seismic signals in a manner so as to compensate for differences in travel paths of reflected vibrations.

Other objects, advantages, and features of the invention should become apparent from the following detailed description which is taken in conjunction with the accompanying drawings in which:

FIGURE 3 is a schematic view of apparatus employed to combine individual signals.

FIGURE 4 is a schematic view of a plurality of seismometers at a common location.

FIGURE 5 is a perspective view of the apparatus of this invention.

FIGURE 6 is a schematic circuit drawing of the electrical components of the apparatus of this invention.

Figure 1:
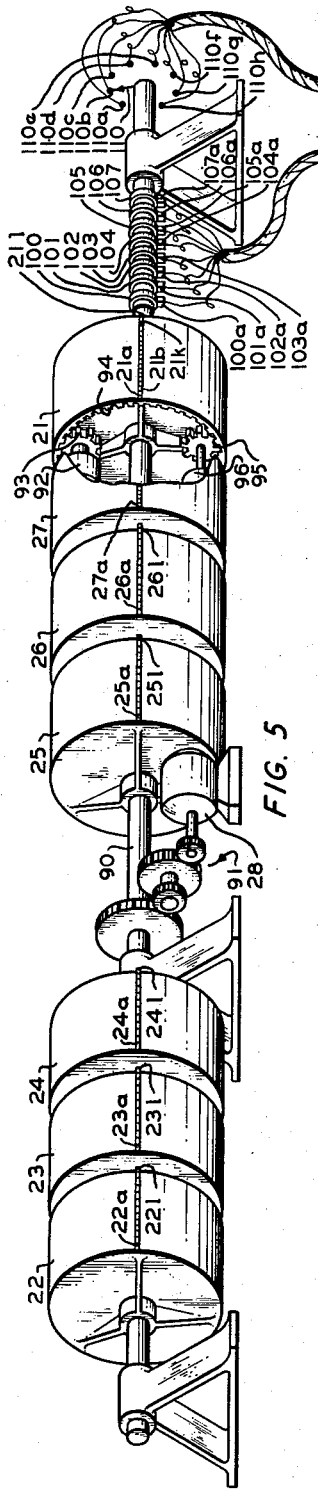
FIGURE 1 is a schematic representation of the locations of the shot points and seismometers which can be employed in carrying out the method of this invention.

Referring now to the drawing in detail and to FIGURE 1 in particular, there is shown a schematic representation of field procedure employed in the seismic exploration system of this invention. Vibrations are established at a first point near the surface of the earth by detonating an explosive charge $A_1$ in a shot hole 10. A plurality of seismometers $S_1$, $S_2$, $S_3$, $S_4$, $S_5$, and $S_6$ are positioned near the surface of the earth along a common line. These seismometers are spaced equal distances from one another. Second seismometers $S_{12}$, $S_{13}$, and $S_{14}$ are positioned along the same line in spaced relationship with one another on the opposite side of shot hole 10. These seismometers can represent individual vibration responsive transducing elements, or they can represent a plurality of such elements grouped together, as is conventional in the seismic exploration art. When a plurality of seismometers are located at or near a common point, the outputs are summed to give a single signal. These seismometers preferably are of the type which convert mechanical vibrations incident thereon into counterpart electrical signals. These signals are amplified and recorded in the manner described hereinafter in detail. In FIGURE 1, reference numeral 20 designates a subterranean reflecting bed which is substantially horizontal. Under these conditions, it should be evident that seismometers $S_1$, $S_2$, $S_3$, $S_4$, $S_5$, $S_6$, $S_{12}$, $S_{13}$, and $S_{14}$ receive vibrations that are reflected from bed 20 at points $R_1$, $R_2$, $R_3$, $R_4$, $R_5$, $R_6$, $R_1'$, $R_2'$, and $R_3'$, respectively.

A second explosive charge $A_2$ is then detonated in a shot hole 11 which is located adjacent original seismometer $S_1$. Additional seismometers are positioned at locations $S_7$ and $S_{15}$. It should be evident that vibrations are received at seismometers $S_2$, $S_3$, $S_4$, $S_5$, $S_6$, $S_7$, $S_{11}$, $S_{12}$, $S_{13}$, $S_{14}$, and $S_{15}$ which are reflected from points $R_3$, $R_4$, $R_5$, $R_6$, $R_7$, $R_8$, $R_1$, $R_1'$, $R_2'$, $R_3'$, and $R_4'$, respectively, on bed 20. Third and fourth explosive charges $A_3$ and $A_4$ are then detonated in sequence in respective shot holes 12 and 13. Vibrations are received at six seismometers on each side of the respective shot holes in the manner illustrated. This procedure is continued with explosive charges being detonated in shot holes at locations illustrated by seismometers $S_4$, $S_5$, $S_6$, etc. Six seismometers are located on each side of the shot holes merely for the purpose of simplifying the explanation. Actually, a greater number are usually employed in most field operations.

Figure 2:
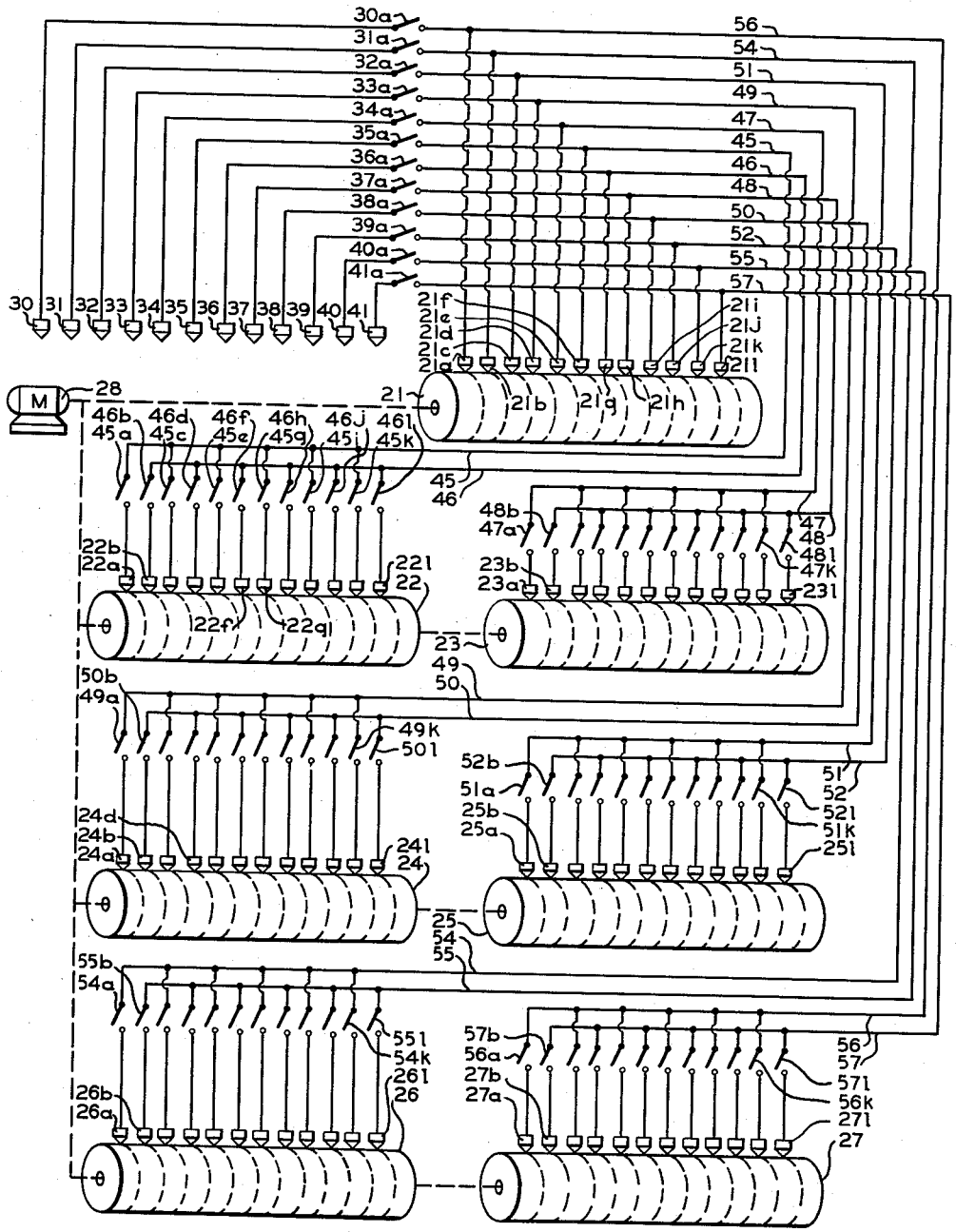
FIGURE 2 is a schematic representation of the recording and reproducing apparatus which is employed in conjunction with the seismic system of FIGURE 1.

The recording apparatus employed to carry out this invention is illustrated schematically in FIGURE 2. A plurality of drums 21, 22, 23, 24, 25, 26, and 27 are rotated in unison by a motor 28. Magnetic recording tapes are mounted on each of these drums and a plurality of recording heads are positioned in spaced relationship adjacent each of the drums. For example, recording heads 21a, 21b, 21c, 21d, 21e, 21f, 21g, 21h, 21i, 21j, 21k, 21l are mounted adjacent drum 21. Similar recording heads are mounted adjacent each of the remaining drums 22, 23, 24, 25, 26, and 27. A plurality of seismometers 30 to 41 are illustrated in FIGURE 2. These seismometers are connected through respective switches 30a, 31a, . . . 41a to recording heads 21a, 21b, . . . 21l of drum 21. In this manner, the signals received by the twelve seismometers are recorded on respective channels of magnetic drum 21 when the switches are closed. At the time the first explosive charge is detonated in shot hole 10, seismometers 36, 37, 38, 39, 40, 41, 35, 34, and 33 of FIGURE 2 represent seismometers $S_1$, $S_2$, $S_3$, $S_4$, $S_5$, $S_6$, $S_{12}$, $S_{13}$, and $S_{14}$, respectively, of FIGURE 1. The vibrations received by these several seismometers are thus recorded on drum 21. It should be evident that the recording system is shown only schematically in FIGURE 2. In actual practice, it is customary to employ amplifiers between the seismometers and the recording heads. Amplitude modulation and frequency modulation recording systems can also be utilized to advantage to make the initial recordings.

The recording heads associated with drum 21 are adjustably mounted with respect to that drum so that the signals can subsequently be reproduced in any desired time relationship. Recording heads 21a, 21b, 21c, 21d, 21e, 21f, 21g, 21h, 21i, 21j, 21k, and 21l of drum 21 are connected to electrical leads 56, 54, 51, 49, 47, 45, 46, 48, 50, 52, 55, and 57, respectively. Leads 45 and 46 terminate adjacent drum 22; leads 47 and 48 terminate adjacent drum 23; leads 49 and 50 terminate adjacent drum 24; leads 51 and 52 terminate adjacent drum 25; leads 54 and 55 terminate adjacent drum 26; and leads 56 and 57 terminate adjacent drum 27. Lead 45 is connected through switches 45a, 45c, 45e, 45g, 45i, and 45k to respective recording heads 22a, 22c, 22e, 22g, 22i, and 22k of drum 22. Lead 46 is connected through switches 46b, 46d, 46f, 46h, 46j, and 46l to respective recording heads 22b, 22d, 22f, 22h, 22j, and 22l of drum 22. The electrical leads associated with drums 23, 24, 25, 26, and 27 are connected through corresponding switches to the recording heads associated with these drums.

As previously mentioned, seismometers 33, 34, 35, 36, 37, 38, 39, 40, and 41 of FIGURE 2 represent seismometers $S_{14}$, $S_{13}$, $S_{12}$, $S_1$, $S_2$, $S_3$, $S_4$, $S_5$, and $S_6$, respectively, of FIGURE 1 at the time explosive charge $A_1$ is detonated in shot hole 10. The signals received by these seismometers are recorded on respective channels of drum 21. The switches between the seismometers and drum 21 are then opened and the signals originally recorded on drum 21 are transferred to the remaining drums. For example, the signals originally recorded on drum 21 by recording heads 21f and 21g are recorded on drum 22 by respective recording heads 22a and 22b. This is accomplished by rotating the drum 21 under heads 21f and 21g which then serve as reproducing heads. Switches 45a and 46b are closed at this time. In like manner, signals originally recorded on drum 21 by heads 21e and 21h are recorded on drum 23 by heads 23a and 23b. Switches 47a and 48b are closed at this time. All of the signals originally recorded on drum 21 are thus transferred to respective ones of the second drums in this same manner. When the second explosive charge is detonated in shot hole 11, seismometers 31 to 41 of FIGURE 2 represent respective seismometers $S_{15}$, $S_{14}$, $S_{13}$, $S_{12}$, $S_{11}$, $S_2$, $S_3$, $S_4$, $S_5$, $S_6$, and $S_7$ of FIGURE 1. These second signals are recorded on drum 21 and subsequently reproduced on the remaining drums. For example, the signals originally recorded by heads 21f and 21g are recorded on drum 22 by means of respective recording heads 22c and 22d. Switches 45c and 46d are closed at this time. The same operation is repeated for each of the adjacent shot holes.

In accordance with the present invention, signals representing reflections from a common subterranean point are combined with one another so that the amplitudes of the reflections are added, whereas the random vibrations tend to cancel one another. With reference to FIGURE 1, it can be seen that a plurality of reflections are received from point $R_1$ on bed 20, for example. These reflections include the vibrations emitted from shot points $A_1$, $A_2$, $A_3$, and $A_4$ which are received at respective seismometers $S_1$, $S_{11}$, $S_{12}$, and $S_{13}$. The signals representing these reflections are combined by reproducing these corresponding signals from the several secondary drums simultaneously. This requires that the signals originally recorded on these secondary drums be displaced with respect to one another so as to compensate for weathering and elevation corrections and are computed by means conventional to the art of seismic prospecting such as "uphole time corrections" or "first break refraction weathering computations." When recorded signals from different shot points are reproduced together, the signals must be displaced from one another by times representative of the differences between the elevation and weathering corrections. These corrections are made at the time the signals are transferred from drum 21 to one of the other drums. The several recording and reproducing heads associated with drum 21 are adjustably mounted so that they can be positioned at different points on the circumference of the drum. In this manner, the signals reproduced from drum 21 are recorded on the other drums at such times as to compensate for the weathering and elevation corrections herein described.

A second important correction which must be made when the signals are combined is to compensate for differences in angularity of path. It should be evident that the signal reflected at point $R_1$ from charge $A_1$ travels a shorter distance in reaching seismometer $S_1$ than does the signal which is reflected from the same point but which originates at charge $A_3$ and is received at seismometer $S_{13}$. In order that the signals may be combined in such a manner that the reflections reinforce one another and the random noise vibration cancel, the signals must be displaced in time relationship with respect to one another so that the common reflections appear simultaneously on the composite record. In practice, the depth and the dip of bed 20 can arbitrarily be estimated and corresponding spread corrections applied for each shot point from a knowledge of the horizontal distance between the shot point and the associated seismometer. The recorded signals can then be reproduced together with this computed time difference to form a composite record. If the depth of the bed is estimated nearly correctly, then peak output signals are obtained. This procedure can be repeated for a number of estimated depths and slope of bed 20 until the signals are most nearly superimposed. When the signals are superimposed in this manner, a maximum peak is obtained which is representative of the depth and dip of the reflecting bed.

Apparatus is provided in accordance with the present invention for transferring the recorded signals on drum 21 to the other drums 22 to 27 in such a manner as to compensate for the differences in travel paths. Most seismic signals contain reflections from a plurality of beds spaced different depths below the surface of the earth. It should be evident that the differences in travel paths for different seismometer and shot hole spacings become relatively less for reflections at progressively lower depths. Thus, it is desirable to apply a correction factor to the individual signals which varies progressively with respect to time. The apparatus shown in FIGURES 5 and 6 provides such a correction.

The drums 22 to 27 of FIGURE 2 are mounted on a common drive shaft 90, as illustrated in FIGURE 5. Shaft 90 is rotated by motor 28 through suitable speed-reduction gears 91. Drum 21 is mounted loosely on shaft 90 so as to be free to rotate with respect to this shaft. A motor 92 is mounted within and secured to drum 27. The drive shaft of motor 92 carries a spur gear 93 which extends into drum 21 and engages teeth 94 which are carried by drum 21. If motor 92 is at rest, drum 21 is thus rotated with drum 27. If motor 92 is rotating, drum 21 revolves about shaft 90 at a speed greater or less than the speed of drum 27, depending upon the direction of rotation of motor 92. A second spur gear 95 meshes with teeth 94 to drive the contactor of a potentiometer 96 which is mounted within drum 27.

A plurality of slip rings 100 to 107 are carried by drive shaft 90 and are engaged by respective brushes 100a to 107a. These brushes are connected to a servo control unit 108. A switch arm 110 is also carried by drive shaft 90 so as to engage contacts 110a, 110b ... 110h in sequence as drive shaft 90 is rotated.

Contacts 110a, 110b ... 110h are connected to the contactors of respective potentiometers 110a, 111b ... 111h, as shown in FIGURE 6. These potentiometers are connected in parallel relationship with one another across a voltage source 112. Voltage source 112 is also connected between brushes 100a and 102a. These brushes are connected to respective brushes 100b and 102b through respective slip rings mounted on drive shaft 90 and by wires within shaft 90. The slip rings have been eliminated from FIGURE 6 in order to simplify the drawing. The end terminals of potentiometer 96 are connected to brushes 100b and 102b, respectively. The contactor of potentiometer 96 is connected through brushes 101b and 101a to a vibrating contact 113. A coil 114 is mounted adjacent contact 113 and is energized by a source of alternating current 115. This results in contact 113 vibrating back and forth between spaced stationary contacts 116 and 117. Contacts 116 and 117 are connected to the respective end terminals of the primary winding of a transformer 118. The center tap of the primary winding of transformer 118 is connected through brush 107a to switch arm 110.

The secondary winding of transformer 118 is connected to the input of a voltage amplifier 120. The first output terminals of amplifier 120 is connected through a capacitor 121 to the control grids of triodes 122 and 123. The second output terminal of amplifier 120 is grounded. The control grids of triodes 122 and 123 are connected to ground through a common resistor 124. The cathodes of triodes 122 and 123 are connetced to ground through a common resistor 125. The anodes of triodes 122 and 123 are connected to the respective end terminals of the secondary winding of a transformer 126. Current source 115 is connected to the primary winding of transformer 126. The center tap of the secondary winding of transformer 126 is connected through brushes 103a and 103b to one terminal of the first coil 128 of motor 92, the latter being a two-phase induction motor. The second terminal of coil 128 is connected to ground through brushes 104b and 104a. A capacitor 129 is connected in parallel with motor coil 128. One terminal of current source 115 is connected through a capacitor 130 and brushes 105a and 105b to the first terminal of the second coil of motor 92. The second terminal of coil 131 is connected through brushes 106b and 106a to the second terminal of current source 115.

The contactors of potentiometers 111a, 111b ... 111h are initially adjusted so that either progressively larger or progressively smaller potentials are applied to switch arm 110 as the switch arm is rotated by shaft 90 to engage contacts 110a, 110b ... 110h in sequence. This potential is applied to one of the inputs of the voltage comparing circuit which comprises transformer 118 and contacts 116 and 117. The second input potential to this comparison circuit is the potential at the contactor of potentiometer 96. The phase of the output signal of transformer 118 depends upon which of the input signals is the larger, and the amplitude of the output signal depends upon the magnitude of this difference. This signal is amplified and applied to the motor drive circuit which comprises triodes 122 and 123. These two triodes are capable of conducting alternately when the potentials on the respective anodes are positive. The amounts of conduction are functions of the input signal applied to the control grids of the two triodes. The phase of the signal applied to motor coil 128 is representative of the phase of the output signal of transformer 118. This signal drives motor 92 in a direction representative of this phase. This rotation of motor 92 rotates gears 93 and 95 to adjust the contactor of potentiometer 96 to tend to equalize the two voltages compared by the vibrator circuit. This rotation also displaces drum 21 with respect to drum 27. The displacement increases or decreases progressively as the drums rotate on shaft 90. Thus, the signals applied to one of the drums 22 to 27 from drum 21 is displaced progressively by an amount representative of the difference in travel times of the reflected vibrations.

The drum rotation system of FIGURES 5 and 6 thus performs a continuous dynamic correction for angularity of path. The settings of the potentiometers 111a, 111b ... 111h can be estimated in accordance with assumed dips of the beds to be identified. If these assumptions are correct, the final composite records exhibit maximum peaks. The procedure can be repeated a number of times with different assumed dips until records with maximum peaks are obtained.

From an inspection of FIGURE 2 in view of the previous discussion, it can be seen that the signals having corresponding path lengths are recorded on corresponding drums 22 to 27. The signals received at the seismometers adjacent each shot hole are recorded on drum 22. Similarly, the signals received at the seismometers spaced twice this distance from the shot holes are recorded on drum 23. Drums 24, 25, 26, and 27 contain the signals received at seismometers spaced progressively greater distances from the shot points.

The signals can be recombined to produce a composite record by means of the apparatus illustrated in FIGURE 3. A mixer circuit 75 is provided with twelve input terminals 75a, 75b ... 75l. Normally, only six of these input terminals are required in order to combine the records as previously described. The output of mixer circuit 75 is connected to the input of a recorder 76, which can be a photographic or magnetic recorder. The compositing process should now be evident from an inspection of FIGURE 2. Reflections from point $R_5$ on bed 20 are considered by way of example. When explosive charge $A_1$ is detonated, reflections from point $R_5$ are received at seismometer location $S_5$. This is represented by seismometer 40 in FIGURE 2. The signals received by this seismometer are reproduced on drum 26 by recording head 26b. When explosive charge $A_2$ is detonated, reflections from point $R_5$ are received at seismometer location $S_4$, which corresponds to seismometer 38 of FIGURE 2. This signal is reproduced on drum 24 by recording head 24d. When explosive charge $A_4$ is detonated, reflections from point $R_5$ are received at seismometer location $S_3$, which corresponds to seismometer 36 of FIGURE 2. This signal is reproduced on drum 22 by recording head 22f. When explosive charge $A_4$ is detonated, reflections from $R_5$ are received by seismometer location $S_2$, which corresponds to seismometer 35 of FIGURE 2. This signal is reproduced on drum 22 by recording head 22g. Two additional signals representing reflections from point $R_5$ are received when explosive charges are subsequentially detonated at locations $S_4$ and $S_5$. The six signals are then reproduced and combined with one another by means of the apparatus illustrated in FIGURE 3. Six of the input terminals of mixer circuit 75 are connected to respective heads on the drums 22, 24, and 26 which are associated with the signals representing the reflections from point $R_5$. This procedure is repeated for each of the reflecting points.

In some applications of this invention it has been found that satisfactory results are obtained by combining reflections from a common area rather than from a common point. For example, reflections from points $R_5$ and $R_6$ on bed 20 can be combined in a single composite record. This requires the twelve inputs of mixer circuit 75. While the reproducing circuit of FIGURE 3 has been shown as comprising 12 input terminals, it should be evident that a permanent system with switches can be provided so that the reproducing mixer circuit can be connected to selected reproducing heads of the drums.

As previously mentioned, each seismometer of FIGURE 2 can represent a plurality of seismometers. This is illustrated in FIGURE 4 wherein seismometers 80 to 85 represent seismometer group 30'. The outputs of these six seismometers are summed by amplifier 86. Seismometers 80 to 85 can be on a common line, in a circle, or other conventional arrangement.

In view of the foregoing it should be evident that there is provided in accordance with this invention improved apparatus for use in seismic prospecting wherein reflections from a common point or common area of a subterranean formation are combined to produce a strong signal with a minimum amount of noise. By positioning the seismometers on both sides of the shot point and along a common line it is possible to obtain a maximum amount of information from a given number of shot points. This procedure has been found to produce valuable information in areas where satisfactory results could not be obtained heretofore.

While the invention has been described in conjunction with present preferred embodiments, it should be evident that it is not limited thereto.

What is claimed is:

1. Apparatus for use in seismic surveying comprising a first signal storage means, a reproducing head positioned adjacent said first storage means, a second signal storage means, a recording head positioned adjacent said second storage means, means to connect said reproducing head to said recording head, means to move said second storage means relative to said recording head, means responsive to movement of said second storage means relative to said recording head to move said first storage means relative to said reproducing head, and means to vary the movement of said first storage means relative to said second storage means.

2. The apparatus of claim 1 wherein said means to move said first storage means relative to said reproducing head and said means to vary comprise a motor carried by one of said storage means, means connecting the drive shaft of said motor to the other of said storage means so that rotation of said motor moves the storage means relative to one another, and means to energize said motor.

3. The apparatus of claim 2 wherein said means to energize said motor comprises a source of electrical energy, means to energize said motor from said source of energy, and means to vary progressively the amount of energy from said source which energizes said motor.

4. The apparatus of claim 2 wherein said means to energize said motor comprises a current source, a plurality of potentiometers connected across said current source, a switch arm carried by said second storage means so as to engage the contactors of said potentiometers in sequence, and means responsive to the potential at said switch arm to energize said motor.

5. Apparatus for use in seismic surveying comprising a first shaft, means to rotate said first shaft at a predetermined velocity, a first signal storage drum carried by said shaft, a recording head mounted adjacent said first drum, a second signal storage drum mounted on said shaft adjacent said first drum but free to rotate relative to said shaft, a reproducing head mounted adjacent said second drum, means to connect said recording head to said reproducing head, a motor carried by one of said drums, means connecting the drive shaft of said motor to the other drum so that rotation of said motor moves said other drum relative to said one drum, and means to energize said motor.

6. The apparatus of claim 5 wherein said drums carry magnetic recording mediums on the surfaces thereof.

7. The apparatus of claim 5 wherein said means to energize said motor comprises a current source, a plurality of potentiometers connected across said current source, a switch arm carried by said second storage means so as to engage the contactors of said potentiometers in sequence, and means responsive to the potential at said switch arm to energize said motor.

8. Apparatus for use in seismic surveying comprising a first shaft, means to rotate said first shaft at a predetermined velocity, a first signal storage drum carried by said shaft, a recording head mounted adjacent said first drum, a second signal storage drum mounted on said shaft adjacent said first drum but free to rotate relative to said shaft, a reproducing head mounted adjacent said second drum, means to connect said second head to said first head, a motor mounted within said first drum so that the drive shaft thereof extends into said second drum, means connecting said drive shaft to said second drum so that rotation of said drive shaft rotates said second drum relative to said first drum, and means to energize said motor.

9. The apparatus of claim 8 wherein said means to energize said motor comprises a current source, a plurality of first potentiometers connected across said current source, a switch arm carried by said first shaft so as to engage the contactors of said potentiometers in sequence, a second potentiometer connected across said current source, means responsive to rotation of said second drum relative to said first drum to adjust the contactor of said second potentiometer, means to compare the potentials at the contactor of said second potentiometer and said switch arm, and means responsive to said means to compare to energize said motor.

10. Apparatus for use in seismic surveying comprising a first signal storage means, a first recording and reproducing head positioned adjacent said first storage means, a second signal storage means, a second recording and reproducing head positioned adjacent said second storage means, means to connect said first head to said second head, means to move said second storage means relative to said second head, means responsive to movement of said second storage means relative to said second head to move said first storage means relative to said first head, and means to vary the movement of said first storage means relative to said second storage means.

References Cited in the file of this patent

UNITED STATES PATENTS

| | | |
|---|---|---|
| 2,443,098 | Dean | June 8, 1948 |
| 2,604,955 | Hawkins | July 29, 1952 |
| 2,671,375 | Boucher | Mar. 9, 1954 |
| 2,767,389 | McCollum | Oct. 16, 1956 |
| 2,795,287 | Sharpe | June 11, 1957 |
| 2,800,639 | Lee | July 23, 1957 |
| 2,876,428 | Skelton | Mar. 3, 1959 |